(12) United States Patent
Springmann et al.

(10) Patent No.: US 8,267,154 B2
(45) Date of Patent: Sep. 18, 2012

(54) ROLL AND ROLL ARRANGEMENT FOR A CONTINUOUS CASTING INSTALLATION

(75) Inventors: Georg Springmann, Mülheim an der Ruhr (DE); Dirk Hasselbrink, Duisburg (DE); Dieter Warmbier, Moers (DE); Matthias Nobbe, Mülheim an der Ruhr (DE); Christian Dratva, Zürich (CH)

(73) Assignees: Georg Springmann Industrie- und Bergbautechnik GmbH, Mülheim an der Ruhr (DE); SMS Concast AG, Zürich (CH)

( * ) Notice: Subject to any disclaimer, the term of this patent is extended or adjusted under 35 U.S.C. 154(b) by 0 days.

(21) Appl. No.: 13/140,847

(22) PCT Filed: Sep. 3, 2010

(86) PCT No.: PCT/EP2010/062997
§ 371 (c)(1),
(2), (4) Date: Jun. 20, 2011

(87) PCT Pub. No.: WO2011/026957
PCT Pub. Date: Mar. 10, 2011

(65) Prior Publication Data
US 2012/0043047 A1    Feb. 23, 2012

(30) Foreign Application Priority Data

Sep. 4, 2009   (DE) .......................... 10 2009 040 117
Nov. 24, 2009  (DE) .......................... 10 2009 047 079

(51) Int. Cl.
*B22D 11/128* (2006.01)
(52) U.S. Cl. ........ 164/442; 164/448; 164/476; 164/484; 492/46
(58) Field of Classification Search .................. 164/442, 164/448, 476, 484; 29/527.5–527.7; 492/1–3, 492/6, 7, 46, 47
See application file for complete search history.

(56) References Cited

U.S. PATENT DOCUMENTS

| | | | |
|---|---|---|---|
| 3,836,877 A | | 9/1974 | Guntersdorfer et al. |
| 4,631,792 A | * | 12/1986 | Wesemann et al. .............. 492/46 |
| 5,992,901 A | | 11/1999 | Gohres et al. |
| 7,325,586 B2 | * | 2/2008 | Deibl et al. .................... 164/442 |
| 2005/0039875 A1 | * | 2/2005 | Hohenbichler et al. ....... 164/428 |
| 2006/0108102 A1 | | 5/2006 | Springmann et al. |
| 2009/0295151 A1 | | 12/2009 | Springmann et al. |

FOREIGN PATENT DOCUMENTS

| | | |
|---|---|---|
| AT | 327 294 B | 1/1976 |
| DE | 195 41 131 C1 | 4/1997 |
| DE | 103 16 673 A1 | 11/2004 |
| DE | 10 2005 052067 A1 | 5/2007 |
| EP | 1 048 880 A1 | 11/2000 |

* cited by examiner

*Primary Examiner* — Jessica L Ward
*Assistant Examiner* — Kevin E Yoon
(74) *Attorney, Agent, or Firm* — Cahn & Samuels, LLP

(57) ABSTRACT

The invention concerns a roller and a roller arrangement for a continuous casting installation comprising two bearing blocks and the roller carried by the bearing blocks, wherein the roller has a rotationally symmetrical roller casing and wherein the roller bearing is arranged within the roller casing.

31 Claims, 5 Drawing Sheets

ROLL AND ROLL ARRANGEMENT FOR A CONTINUOUS CASTING INSTALLATION

Figure 1:
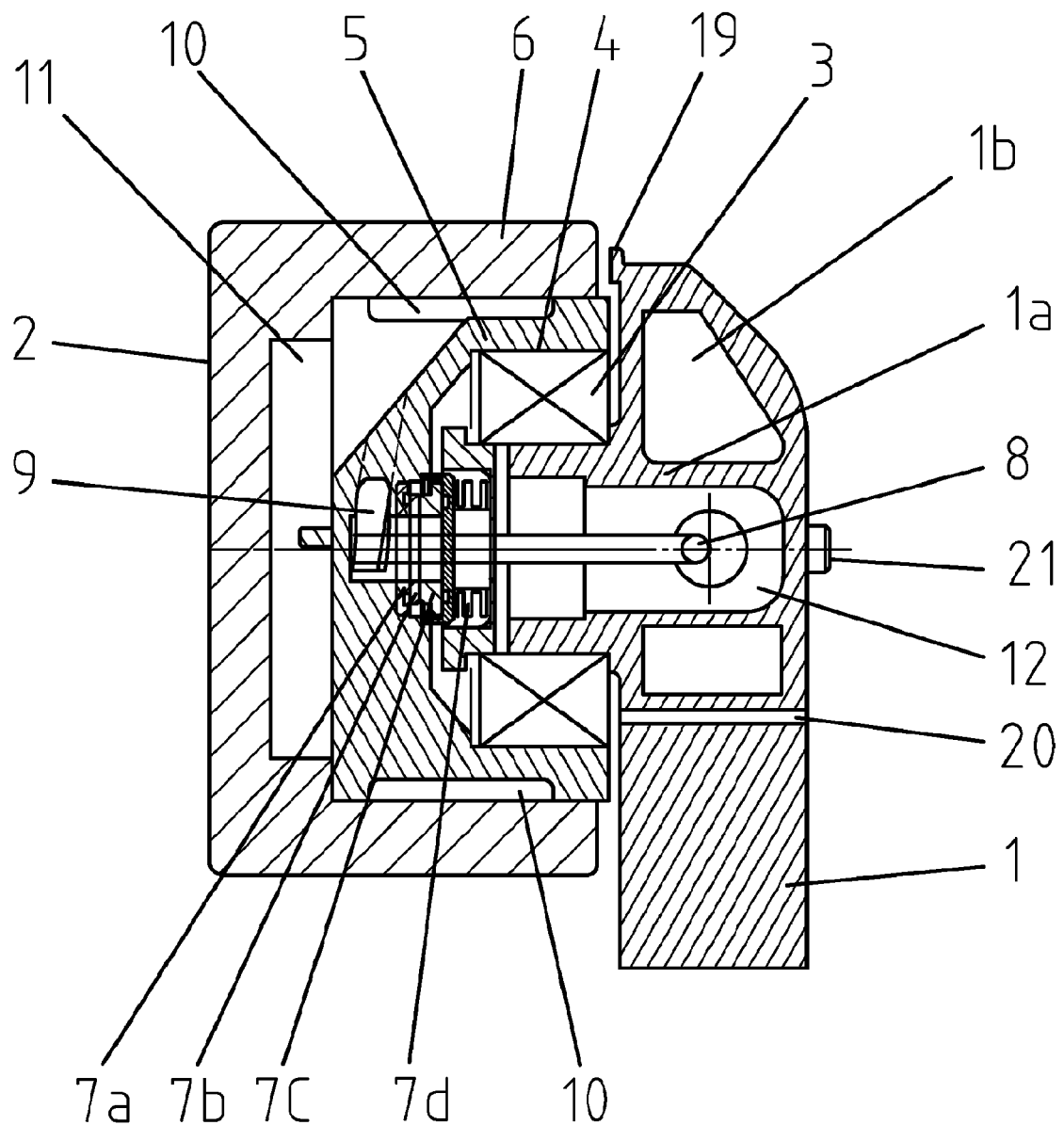

This application is the National Stage of International Application No. PCT/EP2010/062997, filed on Sep. 3, 2010, which claimed the benefit of German Application No. DE 10 2009 040 117.2 filed Sep. 4, 2009 and German Application No. DE 10 2009 047 079.4 filed Nov. 24, 2009, which are hereby both incorporated by reference. The International Application No. PCT/EP2010/062997 was published on Mar. 10, 2011.

I. FIELD OF THE INVENTION

The invention concerns a roller for a continuous casting installation, a roller arrangement using the roller having at least one bearing block and the roller carried thereby, and a strand guide unit using the roller arrangement according to the invention.

II. BACKGROUND OF THE INVENTION

In continuous casting installations for casting metal strands, rotatably mounted rollers are used, the purpose of which is to guide the metal strand along a predetermined path after leaving the mold and to cool it and possibly support it. In that case the rollers are supported externally by way of journals in a bearing block by means of bearings and are cooled in a closed circuit by a feed of a coolant (in particular water) under pressure into the interior of the roller to dissipate the heat, which can be implemented for example by way of the water circuit by way of an axial roller bore passed through the journals.

Depending on the respective casting format and position, support and/or guidance for the metal strand can be effected on all sides, from opposite sides thereof or only from the underside of the strand. Accordingly the rollers are used in different arrangements such as roller rings, displaced double rollers, longitudinal rollers supported in a multiple array or in the form of simple rollers.

The rollers and in particular the peripheral roller casings and the bearings are exposed in operation to an extreme thermal loading by virtue of direct contact with the glowing metal strand and in particular due to radiant heat. That applies in particular to rollers in the web region when dealing with beam blank profiles. Added to that is the aggressive environment, caused by water contaminated with casting powder residues and by water vapour, scale and so forth.

In many cases close spacings are required between the adjacent rollers and consequently the rollers need to be of small diameters in order to efficiently support the casting strand, and that additionally increases the loading on the rollers.

Such close spacings in relation to adjacent strands and other components of the casting installation such as cooling elements or electromagnetic agitator apparatuses require the roller guides to be of as compact a structure as possible. Nonetheless the rollers used and the roller arrangement thereof must enjoy a high level of reliability and afford a long service life and also allow easy maintenance.

The solutions known in the state of the art with bearing blocks at both ends of the generally water-cooled roller body and a separate rotary feed connecting assembly mounted to the bearing block often only inadequately meet the above-mentioned demands.

Examples of such roller arrangements which are known in the state of the art are known from DE 19752336 C1 and EP 857258 A1. In such constructions in particular cooling of the bearing regions is often inadequate.

III. SUMMARY OF THE INVENTION

The object of the present invention is to provide a roller construction which ensures highly efficient cooling of the roller bearing arrangement and the roller casing with at the same time a compact and load-bearing structure, and which is inexpensive to produce.

That object is attained in accordance with at least one embodiment there is provided a journal-less roller which can be supplied with a coolant for a continuous casting installation, comprising a rotationally symmetrical roller casing for receiving coolant and at least one roller insert piece on which there is provided a receiving means for a roller bearing carried on a bearing block journal, wherein the roller insert piece is arranged within the roller casing and is pressure-tightly fixed thereto, wherein the roller insert piece (5) and the roller casing (6) form a cavity (11) for receiving the coolant.

The roller according to the invention is distinguished in particular in that the roller bearing receiving means and in the condition of operation therefore also the roller bearing is arranged within the roller casing which in operation of the continuous casting installation, a rolling mechanism or a calender or the like is supplied with a coolant such as water and the space for receiving the coolant extends at least partially peripherally between the roller bearing receiving means and the roller casing so that optimum cooling of the bearing region during operation of the installation is made possible. To permit a compact design configuration, it is possible in that way to dispense with roller journals and the roller is carried by way of the bearing arranged in the roller bearing receiving means and the journal arranged on the bearing block. By virtue of optimised cooling of the roller casing and the bearings, it is possible to dispense with spray cooling and hot casting or dry casting can be implemented with improved cooling without the occurrence of heat cracks on the roller surfaces.

As a consequence of the roller weight being reduced in comparison with the rollers known in the state of the art, the roller mass to be moved by the roller drive is decreased and thus the roller drives can be structurally smaller and of a less powerful nature and thus costs can be further reduced.

The roller insert piece is generally of a cup-like configuration and with the roller casing forms a cavity which in the operating condition of the roller can be supplied with coolant by way of one or more coolant passages for the feed or discharge thereof. Thus a roller insert piece has at least one coolant passage which opens into the cavity provided. Accordingly in accordance with the invention that permits a shaft-less or spindle-less roller configuration to be adopted.

By virtue of the roller casing being of a shape which is rotationally symmetrical relative to the roller axis, any desired casting shape for the strand or billet can be supported and/or guided, in operation of the roller. Thus strand formats with a curved cross-section as well as those with wavy contours can be produced.

In general the bearing is in the form of a rolling or plain bearing and is disposed in the bearing receiving means in a clearance or press fit. When the roller is of a simple short form, it is sufficient if a bearing is arranged in the bearing receiving means only at one end of the short roller while the other end of the short roller is closed with a cover. With that structure, the short roller is supported by way of one or two bearings only by way of one bearing block journal by one bearing block and the coolant is fed to and also discharged from the cavity enclosed by the roller casing by way of a so-called duo sealing unit.

The bearing block journal is advantageously integral with the bearing block. In that way the bearing block can be produced altogether, in particular by a fine high-quality casting operation, and one or more coolant passages as well as bores can be provided in the bearing block by means of a ceramic core and mechanical post-machining. When suitable alloys are selected therefore it is possible to produce bearing blocks of very high mechanical strength, which in spite of a compact structure can also be provided with internal cooling.

Instead of an integral bearing block with bearing block journal, in principle a configuration of the bearing block in the form of a water-carrying bearing support with a tubular bearing journal is also possible, wherein the roller bearing is mounted on the tubular bearing journal and the tubular bearing journal is coupled in coolant-carrying relationship with the bearing support.

In the case of longer rollers which are carried at both ends, a second roller insert piece which is arranged at the other end of the roller and at which there is a receiving means for a roller bearing supported on a bearing block journal is correspondingly provided, wherein the second roller insert piece is also arranged within the roller casing and pressure-tightly fixed thereto and wherein the two roller insert pieces and the roller casing form a cavity for receiving the coolant. Thus the roller according to the invention can be supported at both ends by a respective bearing block.

Thus in operation of the roller both the roller bearing and also the associated sealing unit which is preferably arranged in the roller casing and particularly preferably is embraced in radially spaced relationship by the roller bearing is cooled by the coolant better than in the case of conventional rollers as the surfaces which are in contact with the coolant on the inside of the roller can better deliver the heat to the coolant.

To simplify manufacture and optimise the water circuit configuration the bearing receiving means is arranged in the roller insert piece which is pressure-tightly fixed to the roller casing. For that purpose the roller insert piece is pushed into the roller casing and welded peripherally at the edge to the roller casing in that way, wherein the roller insert piece preferably terminates almost flush with the roller end. That can be employed in relation to a short roller as described above having a bearing and a roller insert piece only at one end of the roller and also in relation to a longer roller having two bearings and a respective roller insert piece at each end of the roller.

In an embodiment in the operating condition the roller according to the invention is supported at both ends by way of a roller bearing accommodated in the respective roller insert piece on the associated bearing block journal which for reasons of strength and manufacture, as specified hereinbefore, can be formed integrally with the bearing block. In this embodiment, by virtue of the compact configuration, a plurality of roller arrangements (at least two) with roller and bearing block can be disposed in closely mutually juxtaposed relationship, also in a plane which is approximately perpendicular to the axis of the cast strand, also with adjacent rollers with axes of rotation at an angle of for example 90° relative to each other.

Besides functioning as a bearing receiving means a roller insert piece also serves to guide the coolant which is generally cooling water. For that purpose the roller insert piece is so formed and fixed on the roller casing that a peripheral passage is formed between the roller insert piece and the roller casing to receive coolant or a portion in the periphery thereof. That ensures that in operation the roller casing is acted upon with coolant from the inside and heat dissipation is reliably ensured and thus overheating of the bearing is avoided. In an embodiment which is particularly effective for heat dissipation, the peripheral passage is of such a configuration that the feed passage for the coolant, for example a radially extending passage, into the peripheral passage, is only separated by a limb which is in sealing relationship with the roller casing from the discharge passage for the coolant which for example can be a passage formed parallel to the axis of rotation of the roller or at an angle to the axis of rotation.

An improvement in cooling is achieved if the peripheral passage is coupled, preferably by means of a transfer passage, to the cavity for coolant that is formed by the roller casing. In that case for dimensioning in respect of size, the cavity can be filled with at least one filling body/displacement body in order to adjust the amount of required coolant in dependence on the heat to be dissipated and to increase the flow speed and also to be able to pass the coolant in the cavity of the roller. In that way on the one hand the heat can be particularly quickly dissipated while on the other hand the amount of coolant required for that purpose is reduced.

Preferably the roller insert piece is of such a configuration that it has at least one coolant passage which extends in a preferably radial direction and which is coupled to the peripheral passage. In that way the coolant fed to the roller insert piece can be fed directly to the peripheral passage and from there can pass, preferably by means of a transfer passage, into the cavity enclosed by the roller casing.

The configuration according to the invention permits the components to be easily and quickly assembled. When assembling an embodiment of a longer roller, the roller insert pieces are fitted into the roller casing at both sides thereof and welded to the roller casing around it so as to provide a pressure-tight roller body having a coolant cavity between the roller insert pieces and the roller casing. In the operating condition that roller body is preferably carried by way of rolling bearings arranged in the roller bearing receiving means, by a bearing block arranged at each end of the roller body. In that way the roller is supported by the bearing block journal at the associated bearing block by way of a respective rolling bearing arranged at each end of the roller between the respective roller insert piece and the bearing block journal arranged at the bearing block.

Between the roller body and the bearing block journal on the bearing block, there is arranged at least one sealing unit between the bearing block and the roller insert piece such that the coolant passage feeding the coolant in the bearing block is pressure-tightly coupled to the corresponding coolant passage in the roller insert piece in such a way that coolant fed to the roller in operation is fed by way of the coolant passage in the roller insert piece to the coolant cavity in the roller body.

For that purpose, depending on the respective configuration involved, there are provided one or two sealing units, by way of which coolant is fed into and discharged from the coolant cavity in the roller body. In that respect, in the case of a mono sealing unit, the feed of the coolant is by way of the sealing unit arranged at one end of the roller and discharge of the coolant is by way of the mono sealing unit arranged at the other end of the roller.

When using a so-called duo sealing unit in the roller arrangement according to the invention one of the roller insert pieces has a first coolant passage for feeding the coolant into a coolant cavity arranged on the inside of the roller casing and a second coolant passage for the discharge of coolant out of the coolant cavity. In that case those coolant passages are coupled to a coolant passage for feeding the coolant and to a coolant passage for discharging the coolant in the sealing unit and the other of said roller insert pieces does not have any coolant passage and can be provided for example with a blind plug.

In a simple embodiment the roller arrangement according to the invention for a continuous casting installation is so designed that arranged at one end of the roller between the roller insert piece and the bearing block journal is a duo sealing unit which can be pressure-tightly fixed in position and which respectively pressure-tightly couples a coolant passage in the bearing block to the respective one corresponding coolant passage in the roller insert piece for the feed and discharge of the coolant respectively and the other end of the roller casing is closed by a cover.

That embodiment is supported at one side only by way of one bearing block and can be used in particular as a cooled guide roller in relation to cast strand profiles involving a more complex cross-sectional geometry as in the case of beam blank profiles, as a consequence of the reduced amount of space required by that structure.

In a further embodiment of the roller arrangement a respective sealing unit is arranged at each of the two ends of the roller. More precisely each of those roller insert pieces then has a respective coolant passage, wherein one of the roller insert pieces has a coolant passage for the feed of the coolant and the other of the roller insert pieces has a coolant passage for the discharge of the coolant. In that case those coolant passages are respectively coupled to the coolant passage for the feed of the coolant in an associated first mono sealing unit or the coolant passage for discharge of the coolant in an associated second mono sealing unit, in such a way that the coolant fed to the roller at one end in operation thereof is fed by way of the coolant passage in the roller insert piece to the coolant cavity arranged on the inside of the roller casing, and at the other end it is discharged by way of the coolant passage for discharge of the coolant out of the coolant cavity in the roller insert piece.

Cooling can be further improved in the roller arrangement according to the invention if there is provided in the bearing block a cavity for coolant, which can be supplied with coolant in serial relationship with the roller cooling or with coolant in a cooling circuit which is separate from the roller cooling system.

When using a so-called duo sealing unit in the roller arrangement according to the invention one of those roller insert pieces has a first coolant passage for feed of the coolant into a coolant cavity arranged on the inside of the roller casing and a second coolant passage for discharge of the coolant from that coolant cavity. In that case those coolant passages are connected to a coolant passage for the feed of the coolant and to a coolant passage for the discharge of the coolant in the respective sealing unit and the other of those roller insert pieces does not have any coolant passage and can also be closed for example with a blind plug or as in the above-described short roller with a cover insert fitted into the central bore.

For larger strand formats such as blooms it may be necessary for more than one roller to be arranged in a roller arrangement in mutually juxtaposed relationship but on one axis of rotation, and for a plurality of rollers to carry the strand at each side, depending on the respective roller width. Thus a development of the roller arrangement according to the invention has at least one further bearing block, at least one further roller according to the invention which is carried by way of the bearing blocks, wherein arranged between adjacent rollers is a bearing block which carries the adjacent rollers and the at least two rollers are on an axis of rotation. In that case arranged at each end of the roller between the roller insert piece and the bearing block is a mono sealing unit which can be pressure-tightly fixed in position and which pressure-tightly couples a coolant passage in the bearing block to the respective one corresponding coolant passage in the roller insert piece for the coolant to pass therethrough.

It is preferred in that respect if the bearing block arranged between the rollers has a cavity through which coolant can flow and which is preferably arranged at the strand side, and thus improved cooling of the bearing regions is achieved on both sides of the bearing block.

A roller and also a roller arrangement in which the roller insert pieces are structurally identical are of particular advantage in terms of cost. In order to produce an optimised flow in the coolant cavity with that structurally identical configuration, the two roller insert pieces are preferably arranged in the roller casing turned relative to each other through an angle of preferably 180° about the roller axis. In order in that case to facilitate assembly and positioning of the roller insert pieces the roller insert pieces each have a preferable positioning aid such as for example a preferably semicircular positioning nose. Such positioning noses can preferably be arranged in the assembled condition turned relative to each other through an angle of preferably 180° about the roller axis so that assembly of the two roller insert pieces can be effected only in a position of being turned relative to each other and thus in a position of being optimised in respect of flow.

Any kind of sealing unit such as a rotary introduction arrangement can be used in the roller arrangement according to the invention as long as reliable sealing integrity is guaranteed between the roller insert piece and the bearing block during operation. The roller arrangement is thus independent of the specific configuration of the sealing elements necessary for pressure-tightly securing the inner rotary connecting components or arrangement of the sealing surfaces.

Preferably the sealing unit has an elastic sleeve, preferably in the form of a compensator, which is pressure-tightly fixed on the bearing block or in a housing flange arranged in the bearing block journal. The arrangement can also be implemented in laterally reversed relationship so that the elastic sleeve is arranged on the roller insert piece.

In that respect, when using an elastic sleeve, it is of particular advantage if the sealing unit has two sliding rings which run against each other as the sealing elements, wherein the one sliding ring is carried by the roller insert piece and the other sliding ring is carried by the elastic sleeve. That ensures in a particularly simple fashion that firstly the roller insert piece can be fitted into the roller casing and welded thereto and in a next step the rolling bearing which is preferably arranged on the bearing block journal, preferably with a press fit, is fitted together with the bearing block in a holder means, preferably with a clearance fit, on the roller insert piece. This embodiment ensures that the tilting moments acting on the sealing unit and length dilation due to a temperature gradient when the roller is loaded in operation can be compensated as a consequence of the radial mobility of the sliding rings and the mobility of the elastic sleeve and thus the service life of the apparatus is increased.

In an embodiment a connecting tube for connection to a bearing block support surface coupled to the coolant discharge and/or coolant feed can be fitted into the at least one coolant passage of the bearing block so as to ensure connection to the cooling water feed and discharge lines which are passed at the bottom side.

By virtue of the compact nature of the roller and roller arrangement according to the invention it is possible for the roller arrangements to be arranged at a small spacing in a strand guide unit. In particular it is advantageous in that respect if the axes of rotation of the rollers of the roller arrangements, arranged around the strand, of a strand guide unit, lie in one plane. Preferably that plane is perpendicular to the strand guide direction.

The compact design configuration means that speedy maintenance of a strand guide unit or a segment is possible. For that purpose the roller arrangements according to the invention can be released from the securing surface by virtue of the weight thereof which is reduced in comparison with a roller in the state of the art and, after removal of the bearing block and the bearing, the roller, in the event of wear, can be quickly changed and re-assembled.

Thus according to the invention a strand guide unit having at least four roller arrangements for guiding continuously cast long products of rectangular such as a square cross-section can be implemented in a compact form and a plurality of those strand guide units can be arranged at a small spacing in a strand guide segment. In a corresponding fashion a strand guide unit for guiding continuously cast long products of a double T-shaped cross-section can have four roller arrangements with short rollers supported at one side in a bearing block and four roller arrangements with long rollers respectively supported at both sides in a bearing block, which are arranged in the clockwise direction alternately around the strand and guide it.

Depending on the respectively desired strand cross-section strand guide units can be arranged around it. For example, when dealing with a round strand profile, it is possible to guide and support the strand with only two oppositely arranged roller arrangements and rotationally symmetrical roller casings adapted to the strand cross-section.

Further configurations of the invention are to be found in the description hereinafter and the appendant claims.

VI. BRIEF DESCRIPTION OF THE DRAWINGS

The invention is described in greater detail hereinafter by means of the embodiments by way of example illustrated in the accompanying drawings.

Figure 2:
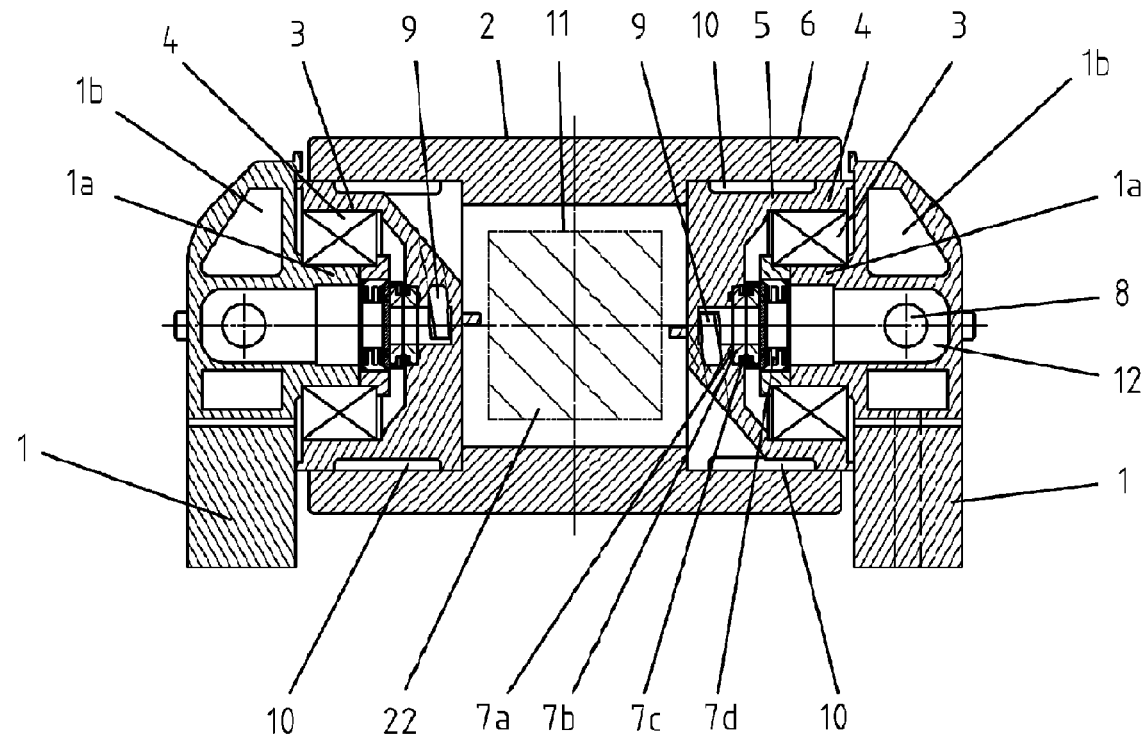
Figure 3:
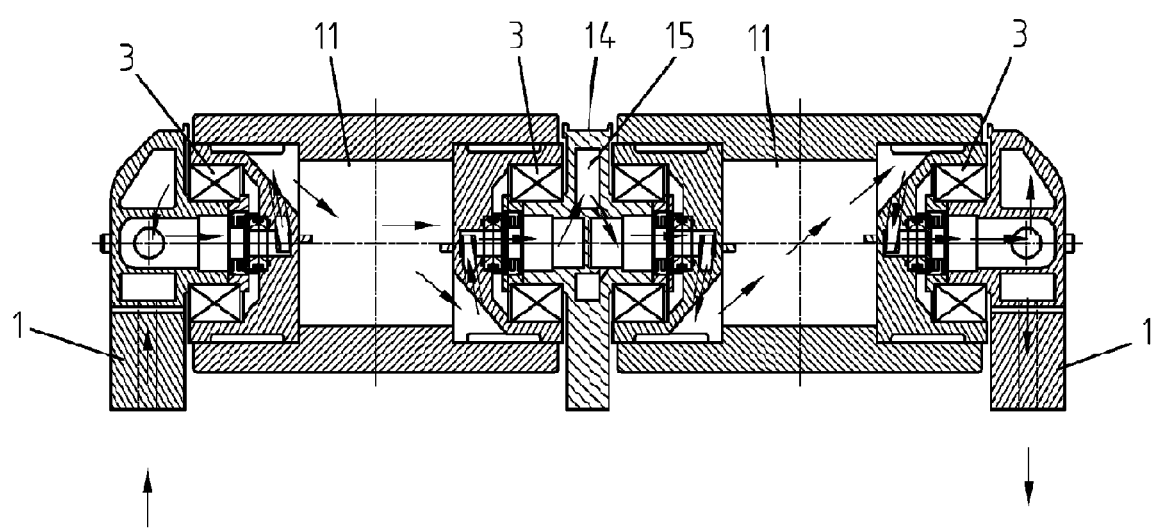
Figure 4:
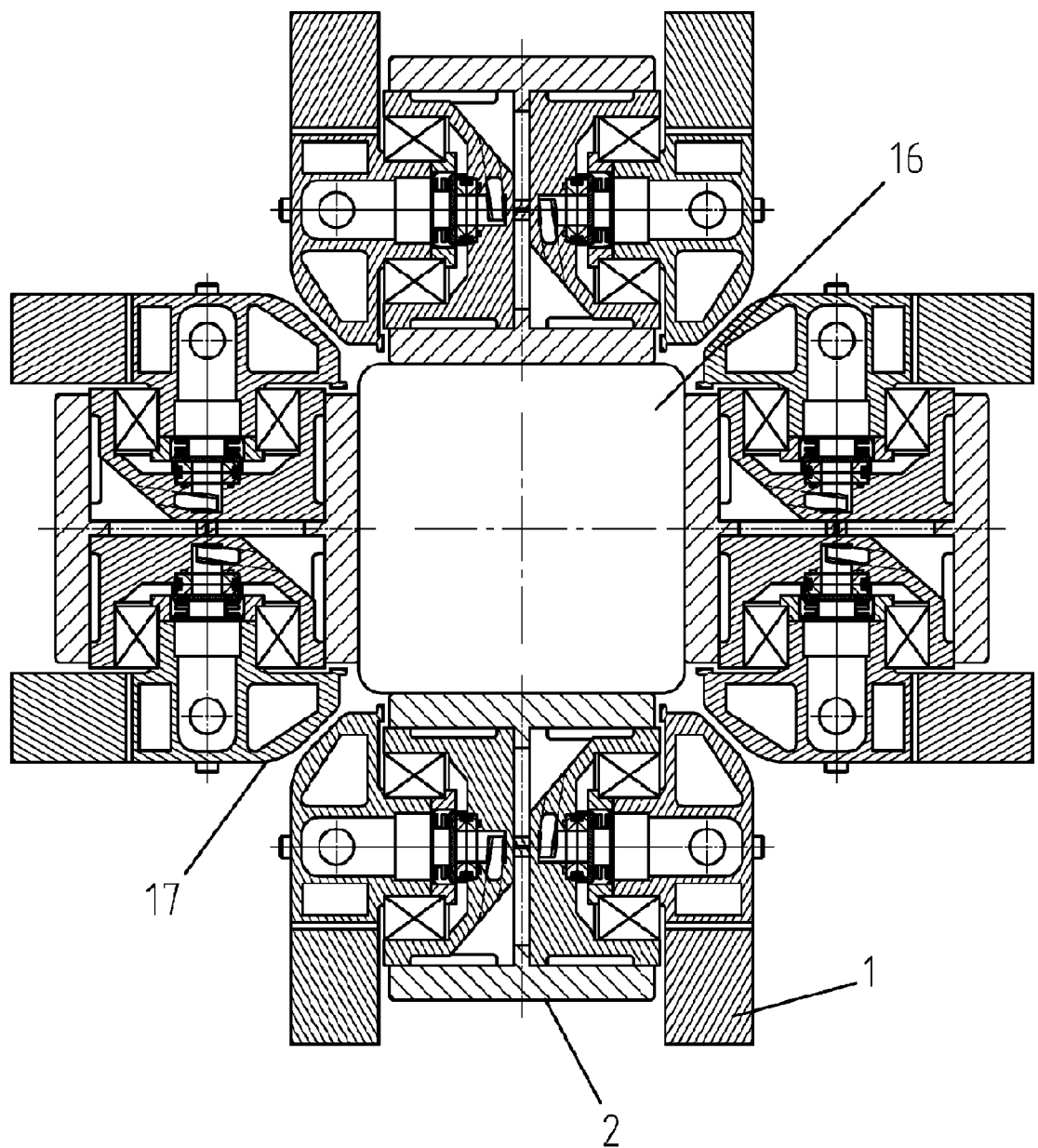
Figure 5:
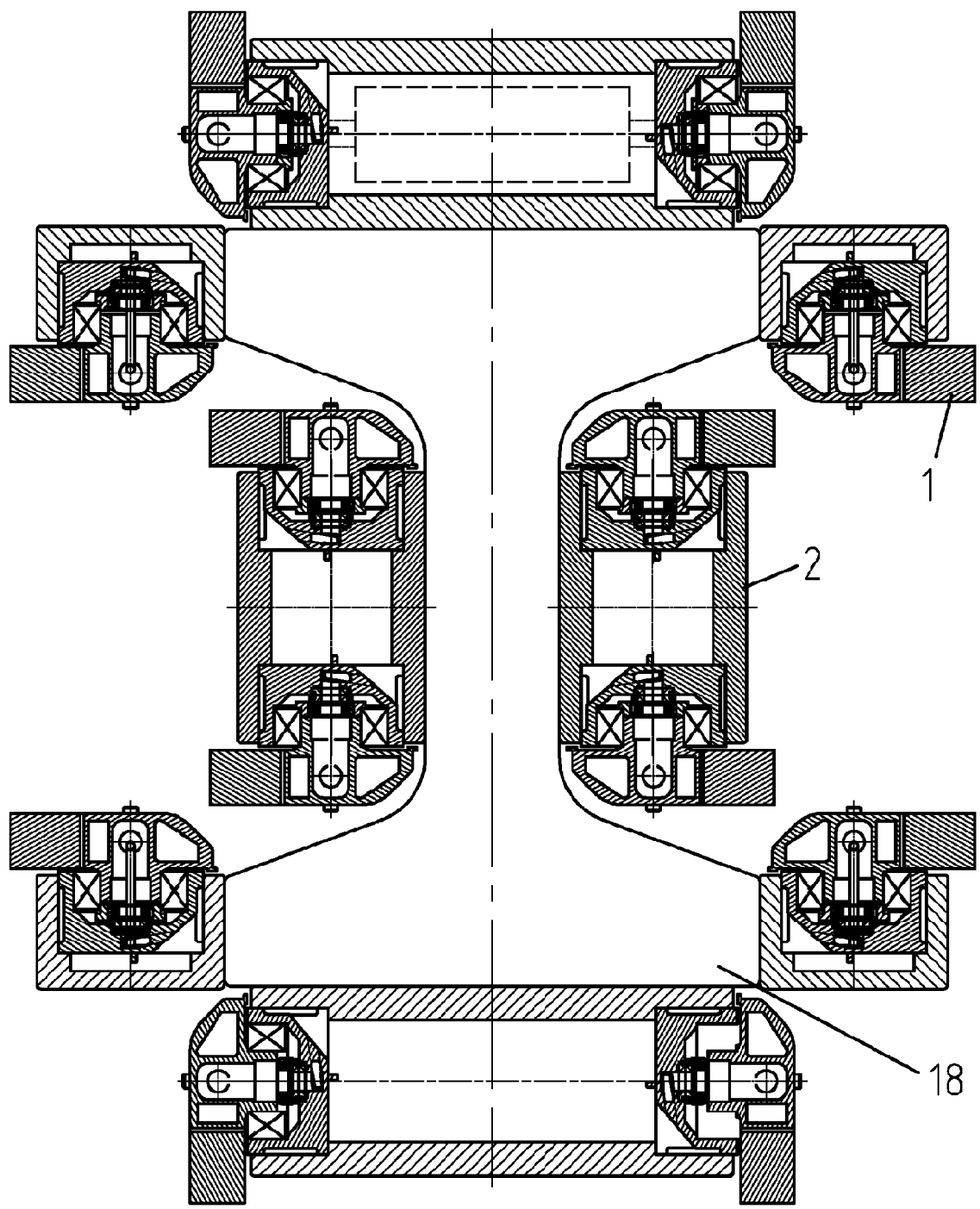

In the drawings:

FIG. 1 shows a cross-sectional view of a first embodiment of the roller arrangement according to the invention, FIG. 2 shows a cross-sectional view of a second embodiment of the roller arrangement according to the invention, FIG. 3 shows a cross-sectional view of a third embodiment of the roller arrangement according to the invention, FIG. 4 shows a cross-sectional view of a first embodiment of a strand guide unit according to the invention, and FIG. 5 shows a cross-sectional view of a second embodiment of a strand guide unit according to the invention.

V. DETAILED DESCRIPTION OF THE INVENTION

As shown in FIG. 1 the roller arrangement according to the invention for a continuous casting installation has a bearing block 1 and a roller 2 carried by the bearing block 1 by way of the bearing block journal (1a). In this case the roller 2 is carried by way of the bearing block journal 1a by the bearing block 1, by way of at least one bearing 3 which for example can be in the form of a rolling bearing and which is arranged in a bearing receiving means 4 in the roller insert piece 5.

Arranged in the cylindrical roller casing 6 of the roller 2 axially between the roller insert piece 5 and the bearing block 1 is a sealing unit 7 (7a, 7b, 7c, 7d) which can be pressure-tightly fixed in place and which pressure-tightly couples the siphon tube 8 to the coolant cavity 11 and the coolant passage in the form of an annular gap around the coolant tube 8 in the bearing block 1 to a corresponding coolant passage 9 in the roller insert piece 5.

The one sealing unit 7 which can be pressure-tightly fixed in place, in the illustrated embodiment, includes a sliding ring carrier 7a, two sliding rings 7b and 7c and a flange 7d which serves to receive and secure an elastic sleeve which is preferably in the form of a compensator. Besides the preferred configuration of the sleeve in the form of a compensator of high-quality steel the elastic sleeve can also be made from other materials which impart elasticity, for example in the form of a rubber hollow cylinder which is possibly reinforced with cloth and which is fitted into the flange 7d. That permits particular flexibility in respect of the sleeve and wear of the apparatus according to the invention when the roller is loaded is reduced.

In the illustrated embodiment the elastic sleeve can be releasably fixed in the flange 7d. The flange 7d itself can be screwed by way of a screw thread into the bearing block journal 1b and fixed to prevent it from being turned out for example by way of a securing pin or by means of adhesive. As also illustrated the flange 7d can also serve to support the bearing 3 and also additionally to fix it by way of a collar that faces towards the roller insert piece.

The bearing block 1 in the illustrated embodiment has two passage portions which are not shown and which are not disposed in the sectional plane and which lead to the bearing block support surface and which are arranged perpendicularly in relation to the roller axis. The perpendicular passage portion for the feed of coolant is preferably of such a configuration or arrangement that adequate turbulence is produced in the bearing block and no air bubbles can accumulate in the passage and the cavity 1b which is preferably provided for receiving coolant in the bearing block. Connecting tubes (not shown) can be inserted in the lower end of the perpendicular passage portions and can be connected to the bearing block support surface, which in turn are coupled to the coolant discharge and/or coolant feed (not shown) in the bottom.

The connecting tubes can be respectively sealed off by way of O-ring seals (not shown) provided at both end portions in relation to the bearing block 1 and the bearing block support surface or by way of an O-ring in the sleeve of the bore. The bearing block is screwed to the support surface by way of connecting screws in such a way as to withstand the loading involved.

The feed of coolant into the coolant cavity 11 in the roller casing 6 is ensured out of the bearing block 1 by way of the illustrated coolant passage 8. Discharge is effected by way of the peripheral passage 10 and the passage 9 extending almost radially in the insert piece 5 and the coolant passage in the form of an annular gap around the siphon tube 8 to the discharge passage 12 in the bearing block. Depending on the respective requirements involved and the design configuration the feed and discharge of the coolant can also be effected in the reversed flow direction through the bearing block, the sealing unit and the above-mentioned coolant passages.

As mentioned hereinbefore provided between the roller insert piece 5 and the bearing block journal 1a is a sealing unit which in the embodiment has in particular a sliding ring 7b, 7c as the sealing element, which is arranged on the region of the roller insert piece 5 that faces towards the flange 7d, and a further sliding ring 7c as a sealing element, that is arranged on the sleeve 7d. In the embodiment therefore the sealing surfaces of the sealing elements 7b, 7c are arranged perpendicularly to the axis of rotation of the roller. That geometrical arrangement of the sealing surfaces of the sealing elements 7b, 7c is admittedly preferred as in that way the forces acting on the sealing elements can be better compensated, but that geometrical arrangement of the sealing surfaces of the sealing elements 7b, 7c is not necessarily required in the roller 1 according to the invention if other sealing units with sealing elements co-operating in a different fashion are employed.

The bearing block 1 can preferably be provided with bores (not shown) which are coaxial with the roller axis and which are closable by closure plugs (not shown) which can be rotatably inserted therein. In maintenance operations on the continuous casting installation the closure plugs can be unscrewed and it is thus possible to provide for the feed of a flushing medium such as compressed air to free the interior of the roller of the cooling water by blowing it out and thus facilitate the maintenance operations. Equally lubricating grease for the rolling bearings 3 can be supplied by way of those closable bores.

In the embodiment shown in FIG. 2 a displacement body 22 is shown in broken-line form, which can be provided depending on the respective size of the cavity 11 and which contributes to a reduction in the amount of coolant, to flow guidance and to an increase in flow speed.

A supply of grease can also be effected by way of supply lines which are arranged at the bottom and in the base of the bearing block to lubricate the rolling bearings and/or to fill the labyrinth seal and to increase the protective action.

Tools can be fitted to bearing journals and also bores for assembly and also removal of the roller.

Preferably provided between the bearing block and the roller casing 6 is a peripherally extending labyrinth seal 19 which prevents the ingress of water and dirt into the region of the bearing 3 and thus contributes to increasing the service life of the bearing.

An insert piece (not shown) can also be provided at the outside of the bearing block 1, being releasably fixed to the bearing block 1 by way of fastening screws. Consequently access from the exterior to the components which in the assembled condition are covered by the insert piece, in particular the sealing unit, for carrying out maintenance operations, can be achieved without any problem by releasing the fastening screws and then removing the insert piece without dismantling of the entire roller arrangement being necessary for that purpose. The insert piece can also serve as a centring spigot to facilitate arranging the components relative to each other upon assembly of the roller arrangement.

In the FIG. 2 embodiment of the roller arrangement according to the invention a roller 2 according to the invention is supported at both sides by way of rolling bearings or plain bearings 3 on the bearing block journals 1a of the bearing blocks 1 and is supplied on the one side starting from the perpendicular passage (not shown) from the bearing block support surface with a feed flow of coolant from the bearing block cavity 1b by way of the passage 13, the mono sealing unit 7, the passage 9 and the passage 10 into the coolant cavity 11 which can be partially filled with filling bodies (not shown) to control the direction and speed of flow of the inflowing volume. The coolant flowing into the cavity 11 is discharged by way of the corresponding passages and components on the opposite side of the roller in the reverse sequence by way of the passage 10, the passage 9, the sealing unit 7, the passage 13 and the coolant cavity 1b and the perpendicular passage (not shown) to the bearing block support surface. By virtue of the symmetrical structure of the overall roller arrangement with preferably structurally identical insert pieces and bearing blocks a reversal of flow is possible just as is laterally reversed assembly of the roller arrangement.

As is apparent from FIGS. 1 and 2 the design configuration of the roller according to the invention and also the bearing block used in the roller arrangement permit optimised heat dissipation from the surfaces that face towards the strand, with simultaneous cooling of the sealing elements and bearings used, by virtue of the configuration of the coolant-carrying passages and cavities. In that way, as a consequence of the improved temperature profile at the roller surface, a higher level of surface quality for the guided strand as well as an enhanced roller service life are also achieved. Thus strand guidance is also a possibility without using spray water.

In the embodiment of the roller arrangement according to the invention as shown in FIG. 3 the roller arrangement of FIG. 2 is extended by an 'extension' element comprising a central bearing block 14 of cross-shaped configuration in the cross-sectional view and a further roller 2 according to the invention so that even wider strand formats of for example rectangular cross-section as in the case of a bloom can be guided. The central bearing block 14 preferably has a coolant cavity 15 which is arranged at the strand side and which, preferably centrally subdivided, can have the coolant flowing therethrough in the direction indicated by the arrow as shown in FIG. 3. The roller width and the number of rollers can be varied in dependence on the desired strand formats so that in principle it is also possible to arrange more than two rollers in a roller arrangement.

In the embodiment of the strand guide unit according to the invention as shown in FIG. 4, four of the roller arrangements shown in principle in FIG. 2 with a narrower roller casing, for guiding a strand of square cross-section, are respectively arranged at a right angle in one plane relative to each other. The structurally identical roller insert pieces 5 are arranged turned through 180° relative to each other in the roller casing 6, wherein the positioning noses 5a permit mutually oriented insertion. As a consequence of that arrangement of the roller insert pieces relative to each other the coolant flows in the optimum fashion through the coolant cavity 11 enclosed by the roller casing 6, and heat is dissipated thereby.

By virtue of the configuration of the bearing blocks having a rounded configuration or flattened/inclined configuration 17 at the side of the bearing block 1 that is remote from the strand 6 and the support surface, the roller arrangements can be disposed in closely spaced relationship and thus the strand can be guided over virtually the entire surface of each side. By virtue of that configuration of the bearing blocks it is also first possible for all four roller arrangements to be disposed in one plane and there is no need, as is known in the state of the art, for the pairs of oppositely disposed rollers to have to be arranged in displaced relationship by a distance with respect to the pairs of rollers arranged at a right angle thereto, and/or for two of the oppositely disposed pairs of rollers to be shortened in length when arranged in one plane in such a way that the thin skin of the strand on the outside thereof is deformed by the internal ferrostatic pressure and/or the bearing arrangement and also the transfer of water are disturbed by the detrimental arrangement of the bearing blocks due to overheating.

Thus it is in turn possible for such strand guide units to be provided at a smaller spacing relative to each other than in the state of the art and thus in turn to permit improved strand guidance.

In the technology of an electromagnetic strand agitator in which the fluid portion in the interior of the strand is caused to rotate by induction by magnetic fields, it is decisive that the agitator coils are arranged as closely as possible to the strand surface. In that case, for reasons of space and service life, the above-mentioned roller arrangement is the solution for such strand agitators for large strand formats, which necessarily have to be supported.

In the embodiment of the strand guide unit according to the invention as shown in FIG. 5 four of the roller arrangements shown in principle in FIG. 1 with a narrower roller casing and each having two bearing blocks are arranged in one plane relative to each other alternately in relation to the embodiment of the roller arrangement according to the invention as shown in principle in FIG. 2, each with only one bearing block, around a strand profile 18 of a double T-shaped cross-section. With this strand form the roller arrangement according to the invention also permits an improvement in guidance of the strand and temperature as well as an increase in the service life of the guide roller. In addition, gentle strand cooling and casting without secondary cooling water is possible due to roller cooling. The embodiment of the roller arrangement according to the invention as shown in principle in FIG. 1, with only one respective bearing block, serves in that case for guiding and supporting the narrow sides of the profile.

LIST OF REFERENCES 1 bearing block with 1a bearing block journal and 1b bearing block cavity
2 roller
3 rolling bearing
4 rolling bearing receiving means
5 roller insert piece with 5a positioning nose
6 roller casing
7 sealing unit comprising 7a carrier, 7b sliding ring, 7c sliding ring, 7d flange with elastic sleeve
8 siphon tube
9 coolant passage in the insert piece
10 peripheral passage
11 coolant cavity
12 discharge passage
13 passage in the bearing block
14 central bearing block
15 coolant cavity
16 billet strand
17 rounded portion of the bearing block
18 beam blank strand
19 labyrinth seal
20 grease feed for bearing
21 centring spigot
22 displacement body

The invention claimed is:

1. A journal-less roller, which can be supplied with a coolant, for a continuous casting installation, comprising:
   a rotationally symmetrical roller casing for receiving coolant; and
   a roller insert piece on which there is provided a receiving means for a roller bearing carried on a bearing block journal, and
   wherein the roller insert piece is arranged within the roller casing and is pressure-tightly fixed thereto,
   wherein the roller insert piece and the roller casing form a cavity for receiving the coolant.

2. The roller according to claim 1, wherein the roller insert piece is respectively fixed to the roller casing such that a peripheral passage for receiving coolant is formed between the roller insert piece and the roller casing.

3. The roller according to claim 2, wherein the roller insert piece has at least one radially extending coolant passage which connects to the peripheral passage.

4. The roller according to claim 3, wherein the peripheral passage connects to the cavity for coolant that is formed by the roller casing.

5. The roller according to claim 1, wherein the roller insert piece has at least one radially extending coolant passage which connects to the peripheral passage.

6. The roller according to claim 5, wherein the peripheral passage connects to the cavity for coolant that is formed by the roller casing.

7. A journal-less roller for a continuous casting installation comprising:
   a rotationally symmetrical roller casing for receiving coolant; and
   two roller insert pieces on each of which there is provided a receiving means for a roller bearing carried on a bearing block journal, and
   wherein the roller insert pieces are arranged within the roller casing and pressure-tightly fixed thereto,
   wherein roller insert pieces and roller casing form at least one cavity for receiving the coolant.

8. The roller according to claim 7, wherein each roller insert piece is respectively fixed to the roller casing such that a peripheral passage for receiving coolant is formed between each roller insert piece and the roller casing.

9. The roller according to claim 8, wherein each roller insert piece has at least one radially extending coolant passage which connects to the peripheral passage.

10. The roller according to claim 9, wherein the peripheral passage connects to the cavity for coolant that is formed by the roller casing.

11. A roller arrangement for a continuous casting installation comprising:
    a bearing block having a bearing block journal;
    a roller bearing;
    a journal-less roller carried by the bearing block journal and the roller bearing, the roller includes
       a rotationally symmetrical roller casing for receiving coolant and
       a roller insert piece on which there is provided a receiving means for the roller bearing carried on the bearing block journal, and
       wherein the roller insert piece is arranged within the roller casing and is pressure-tightly fixed thereto,
       wherein the roller insert piece and the roller casing form a cavity for receiving the coolant,
       wherein arranged at the end of the roller between the roller and the bearing block journal is a sealing unit which is pressure-tightly fixed and which pressure-tightly couples at least one coolant passage in the bearing block to at least one corresponding coolant passage in the roller insert piece.

12. The roller arrangement according to claim 11, wherein the roller bearing is arranged radially around the sealing unit.

13. The roller arrangement according to claim 12, wherein the roller bearing is at least partially carried by the sealing unit.

14. The roller arrangement according to claim 11, wherein the sealing unit includes an elastic sleeve.

15. The roller arrangement according to claim 14, wherein the sealing unit includes two sliding rings which run against each other as sealing elements,
    wherein the one sliding ring is carried directly by at least one of the roller and the roller insert piece and the other sliding ring is carried by the elastic sleeve.

16. The roller arrangement according to claim 11, wherein the bearing block has a cavity through which coolant flows.

17. The roller arrangement according to claim 11, wherein arranged at one end of the roller between the roller insert piece and the bearing block journal is a duo sealing unit which is pressure-tightly fixed and which respectively pressure-tightly couples a coolant passage in the bearing block to the respective one corresponding coolant passage in the roller insert piece for the feed and discharge respectively of the coolant and the other end of the roller casing is closed by a cover.

18. The roller arrangement according to claim 11, wherein the sealing unit includes an elastic sleeve in the form of a compensator.

19. A strand guide unit for guiding a strand in a continuous casting installation comprising:
at least two roller arrangements according to claim 11, wherein axes of rotation of the rollers lie in one plane for guiding continuously cast long products.

20. A roller arrangement for a continuous casting installation comprising:
two bearing blocks each having a bearing block journal;
two roller bearings each of which is carried on one of the two bearing block journals;
a journal-less roller carried by the bearing block journals and the roller bearings, the roller includes
a rotationally symmetrical roller casing for receiving coolant and
two roller insert pieces on each of which there is provided a receiving means for one of the two roller bearings, and
wherein each roller insert piece is arranged within the roller casing and is pressure-tightly fixed thereto,
wherein each roller insert piece and the roller casing form a cavity for receiving the coolant,
wherein arranged at each end of the roller between the roller and one bearing block journal is a sealing unit which is pressure-tightly fixed and which pressure-tightly couples one coolant passage in the corresponding bearing block to one corresponding coolant passage in the corresponding roller insert piece.

21. The roller arrangement according to claim 20, wherein arranged at each end of the roller between the roller insert piece and the bearing block journal is a mono sealing unit which is pressure-tightly fixed and which pressure-tightly couples a coolant passage in the bearing block to a respective corresponding coolant passage in the roller insert piece for passing the coolant.

22. The roller arrangement according to claim 21, wherein the coolant passages respectively connect to the coolant passage for feeding the coolant in an associated first sealing unit and the coolant passage for discharge of the coolant in the associated second sealing unit such that the coolant which is fed at one end to the roller in operation is fed by way of the coolant passage in the first roller insert piece to the coolant cavity arranged on the inside of the roller casing and is discharged at the other end by way of the coolant passage for discharge of the coolant from the coolant cavity by way of the coolant passage in the second roller insert piece.

23. The roller arrangement according to claim 21, further comprising:
wherein one of the two bearing blocks is a central bearing block,
at least one further roller carried by a further bearing and the central bearing block, the at least one further roller includes
a rotationally symmetrical roller casing for receiving coolant and
at least two roller insert pieces on which there is provided a receiving means for a roller bearing carried on a bearing block journal of at least one of the further bearing block and the central bearing block, and
wherein each roller insert piece is arranged within the roller casing and is pressure-tightly fixed thereto,
wherein roller insert pieces and the roller casing form a cavity for receiving the coolant, and
wherein arranged between adjacent rollers is the central bearing block which carries the adjacent rollers and the rollers are on an axis of rotation,
wherein arranged at each end of the rollers between the roller insert piece and the bearing block journal is a mono sealing unit which can be pressure-tightly fixed and which pressure-tightly connects a coolant passage in the corresponding bearing block to the respective one corresponding coolant passage in the roller insert piece for carrying the coolant.

24. The roller arrangement according to claim 23, wherein the central bearing block arranged between the rollers has a cavity through which coolant can flow and which is arranged at a strand side.

25. The roller arrangement according to claim 20, wherein each roller bearing is arranged radially around the corresponding sealing unit.

26. The roller arrangement according to claim 25, wherein the roller bearing is at least partially carried by the corresponding sealing unit.

27. The roller arrangement according to claim 20, wherein each sealing unit includes an elastic sleeve.

28. The roller arrangement according to claim 27, wherein each sealing unit includes two sliding rings which run against each other as sealing elements,
wherein the one sliding ring is carried directly by at least one of the roller and the corresponding roller insert piece and the other sliding ring is carried by the elastic sleeve.

29. The roller arrangement according to claim 20, wherein the sealing unit includes an elastic sleeve in the form of a compensator.

30. The roller arrangement according to claim 20, wherein the bearing block has a cavity through which coolant flows.

31. A strand guide unit for guiding a strand in a continuous casting installation comprising:
at least two roller arrangements according to claim 20, wherein axes of rotation of the rollers lie in one plane for guiding continuously cast long products.

* * * * *